(12) United States Patent
Kuhlmann

(10) Patent No.: US 12,269,154 B2
(45) Date of Patent: Apr. 8, 2025

(54) BATTERY-OPERATED HANDHELD POWER TOOL, BATTERY UNIT FOR A HANDHELD POWER TOOL, SYSTEM WITH THE HANDHELD POWER TOOL AND A BATTERY UNIT, CHARGING DEVICE FOR A BATTERY UNIT AND SYSTEM WITH A BATTERY UNIT AND A CHARGING DEVICE

(71) Applicant: Hilti Aktiengesellschaft, Schaan (LI)

(72) Inventor: Kevin Kuhlmann, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/037,643

(22) PCT Filed: Nov. 9, 2021

(86) PCT No.: PCT/EP2021/081065
§ 371 (c)(1),
(2) Date: May 18, 2023

(87) PCT Pub. No.: WO2022/111989
PCT Pub. Date: Jun. 2, 2022

(65) Prior Publication Data
US 2023/0405784 A1 Dec. 21, 2023

(30) Foreign Application Priority Data
Nov. 27, 2020 (EP) .................................... 20210374

(51) Int. Cl.
*B25F 5/00* (2006.01)
*H01M 10/0525* (2010.01)
(Continued)

(52) U.S. Cl.
CPC ........... *B25F 5/00* (2013.01); *H01M 10/0525* (2013.01); *H01M 10/46* (2013.01);
(Continued)

(58) Field of Classification Search
None
See application file for complete search history.

(56) References Cited

U.S. PATENT DOCUMENTS

| | | | |
|---|---|---|---|
| 2019/0123314 A1* | 4/2019 | Dietel | ................. H01M 50/213 |
| 2019/0160972 A1* | 5/2019 | Zeiler | ................. H01M 10/425 |

FOREIGN PATENT DOCUMENTS

| | | |
|---|---|---|
| DE | 102016205568 A1 | 10/2017 |
| DE | 102017100513 A1 * | 7/2018 |

(Continued)

OTHER PUBLICATIONS

International Search Report of PCT/EP2021/081065 dated Feb. 18, 2022.

*Primary Examiner* — Tanzim Imam
(74) *Attorney, Agent, or Firm* — Davidson Kappel LLC

(57) ABSTRACT

A battery-operated handheld power tool (1) having a receiving bay (4) for releasably receiving at least one battery unit (10, 20, 30) is proposed. The receiving bay (4) has at least four electrical contacts (K1-K4) for making contact with at least four corresponding contacts of the at least one battery unit (10, 20, 30), wherein a load of the handheld power tool (1) is connected between a first contact (K1) and a fourth contact (K4), wherein a switch (3) that can be switched to an open and a closed switching state is connected between a second contact (K2) and a third contact (K3), and wherein a first cell arrangement (31) is connected in series with a second cell arrangement (32) of the battery unit (10, 20, 30) or a first battery unit (10) is connected in series with a second battery unit (20) via the switch (3).

10 Claims, 3 Drawing Sheets

(51) Int. Cl.
     *H01M 10/46*        (2006.01)
     *H01M 50/247*     (2021.01)
     *H01M 50/51*      (2021.01)
     *H02J 7/00*        (2006.01)

(52) U.S. Cl.
     CPC ......... *H01M 50/247* (2021.01); *H01M 50/51* (2021.01); *H02J 7/0024* (2013.01); *H01M 2220/30* (2013.01)

(56) References Cited

FOREIGN PATENT DOCUMENTS

| | | | |
|---|---|---|---|
| DE | 202019107039 U1 * | 4/2020 | |
| WO | WO 2018031719 A1 | 2/2018 | |

* cited by examiner

BATTERY-OPERATED HANDHELD POWER TOOL, BATTERY UNIT FOR A HANDHELD POWER TOOL, SYSTEM WITH THE HANDHELD POWER TOOL AND A BATTERY UNIT, CHARGING DEVICE FOR A BATTERY UNIT AND SYSTEM WITH A BATTERY UNIT AND A CHARGING DEVICE

FIELD OF THE INVENTION

The present invention relates to a battery-operated handheld power tool, to a battery unit for a handheld power tool, to a system with the handheld power tool and the battery unit, to a charging device for a battery unit and to a system with a battery unit and a charging device.

BACKGROUND

Battery units for handheld power tools often have a plurality of cells connected in series with one another in order to increase the output voltage of the battery unit. For example, battery units having ten lithium-ion cells, which have an output voltage of approximately 36 V, are known. A higher output voltage can be an advantage, since a lower current flows with the same electrical power, which is why, for example, line cross sections can be reduced and components for lower currents can be used. In addition, aging of a battery unit can be reduced, since a lower discharge current puts less load on the battery unit.

SUMMARY OF THE INVENTION

However, higher voltages are associated with a higher risk of injury. There are various protective regulations that stipulate, for example, that, above a certain maximum voltage, electrical contacts may no longer be exposed. This then requires a correspondingly higher design effort and makes corresponding devices more complex and more expensive.

Against this background, an object of the present invention is to provide an improved handheld power tool, an improved battery unit and/or an improved charging device.

The present invention provides a battery-operated handheld power tool having a receiving bay for releasably receiving of at least one battery unit. The receiving bay has at least four electrical contacts for making contact with four corresponding contacts of the at least one battery unit, wherein a load of the handheld power tool is connected between a first contact and a fourth contact, wherein a switch that can be switched to an open and a closed switching state is connected between a second contact and a third contact, and wherein a first cell arrangement is connected in series with a second cell arrangement of the battery unit or a first battery unit is connected in series with a second battery unit via the switch.

This handheld power tool has the advantage that the handheld power tool can be operated with a high voltage during operation, which can, for example, be above the protective low voltage of 60 V (direct current) or another threshold value, without the contacts of a battery unit having to be protected with special measures. The use of a plurality of individual battery units has the advantage that the battery units, when they are inserted into the handheld power tool, are not electrically connected to one another in the idle state, which, for example, reduces the risk of a short circuit and the like.

The handheld power tool is, in particular, in the form of a drill, a percussion drill, a hammer drill, a handheld circular saw, a jigsaw, a foxtail saw, an angle grinder, an agitator or the like.

The handheld power tool can be configured, in particular, to receive more than one battery unit, in particular in order to achieve an increased operating voltage for the handheld power tool. The handheld power tool can, however, also be operated with just one battery unit which provides the necessary operating voltage by means of corresponding cell arrangements. The handheld power tool can accordingly be operated with one, two or more than two battery units. It should be noted that "necessary operating voltage" means that voltage for which the handheld power tool is designed. It is therefore not ruled out that the handheld power tool can also be operated with a different voltage.

The at least four electrical contacts are necessary in order to enable a switchable series connection of the battery units or the cell arrangements, which is controlled by a control apparatus of the handheld power tool. A distinction can be made between two applications.

Firstly, a single battery unit can be configured to provide the necessary operating voltage. This battery unit has two cell arrangements internally, which are not electrically connected to one another, but with each of which contact can be made via two contacts which are guided to the outside. When the switch is closed, the two cell arrangements are each connected in series with one another via a contact, whereby the circuit is closed and a voltage corresponding to the sum of the voltages of the two cell arrangements is provided between the two remaining contacts.

Secondly, two (or more than two) battery units can be used, the individual voltages of which are below the necessary operating voltage of the handheld power tool. When the battery units are inserted, they remain electrically disconnected from one another until a main switch or a torque controller or the like is activated by a user. Closing the switch closes the circuit via the two battery units so that a current can flow.

In both cases, a risk emanating from the handheld power tool is reduced, since in particular a predetermined threshold value, for example an upper limit value, can be complied with in a simple constructive manner for the voltage present in the idle state.

When the handheld power tool is in operation, the current for driving an electric motor of the handheld power tool is passed, in particular, via the switch. The switch thus serves at the same time as a safety-increasing component, since it can be used to interrupt the power supply to the electric motor.

According to one embodiment of the battery-operated handheld power tool, the switch is a switch which can be operated manually by a user of the handheld power tool.

According to a further embodiment of the battery-operated handheld power tool, the switch comprises a semiconductor component which can be changed to an open switching state or a closed switching state by means of a specific control signal.

According to a further embodiment of the battery-operated handheld power tool, a control device of the handheld power tool is configured to output the specific control signal on the basis of actuation of a main switch of the handheld power tool.

According to a further embodiment of the battery-operated handheld power tool, the switch comprises two MOSFETs which are connected in series with opposite polarity.

This arrangement is advantageous when using MOSFETs (metal oxide semiconductor field-effect transistor) on account of the body diode, since the body diode could possibly break down. Both MOSFETs are switched via the specific control signal.

Instead of MOSFETs, other types of transistors, such as IGBTs with free-wheeling diodes, can also be used.

According to a further embodiment of the battery-operated handheld power tool, the switch comprises four MOSFETs which are arranged in two pairs connected in parallel with one another, wherein the two MOSFETs of each pair are connected in series with opposite polarity.

This arrangement is advantageous, on the one hand, in order to have redundancy in relation to the failure of a MOSFET, and, on the other hand, the current-carrying capacity of this arrangement is improved and the thermal load on the individual MOSFETs is reduced. All four MOSFETs are preferably switched via the specific control signal.

The present invention also provides a battery unit for a handheld power tool. The battery unit has a plurality of cell arrangements and a plurality of contacts which are guided to the outside in pairs, wherein a respective pair of the plurality can be connected to the poles of an associated cell arrangement of the plurality.

This battery unit can be advantageously used to operate the handheld power tool according to the first aspect.

Passive or active electronic components such as diodes and the like can be arranged between the external contacts and the poles of the respective cell arrangement.

According to one embodiment of the battery unit, each cell arrangement of the plurality has a maximum output voltage of less than 60V.

This means that the output voltage is below the upper limit value for protective low voltage, which is why no special safety measures are required to protect the contacts.

According to one embodiment of the battery unit, each cell arrangement of the plurality comprises a plurality of lithium-ion cells.

According to a further embodiment of the battery unit, each cell arrangement of the plurality has a maximum of 14 lithium-ion cells connected in series.

This embodiment has the advantage that a charging voltage which is needed to charge the respective cell arrangement is below a value of 60 V (direct current). The charging voltage for a single lithium-ion cell is, for example, 4.2 V.

According to a further embodiment of the battery unit, the battery unit has exactly two cell arrangements and four contacts which are guided to the outside.

According to a further embodiment of the battery unit, the battery unit has exactly three cell arrangements and six contacts which are guided to the outside.

The present invention also provides a system with a battery-operated handheld power tool according to the present invention and with a battery unit according to the present invention.

The embodiments and features described for the handheld power tool and the battery unit apply accordingly to the system and vice versa.

The present invention also provides a charging device for charging a battery unit according to the present invention. The charging device is configured to charge each cell arrangement of the battery unit separately.

In particular, the charging device comprises a receiving bay for receiving the battery unit and a plurality of paired contacts corresponding to the battery unit for making contact with the contacts of the battery unit. The cell arrangement that can be connected to the contact pair is charged via a respective contact pair. In this case, each cell arrangement is charged separately from the other cell arrangements. For this purpose, the charging device can have a corresponding plurality of charging circuits for providing the charging voltage and the charging current. Alternatively, provision can be made for the charging device to have only one charging circuit, by means of which the cell arrangements are charged one after the other in terms of time.

If the battery unit has two cell units and four contacts, for example, the charging device accordingly has four contacts and one or two charging circuits. If the battery unit has, for example, three cell units and six contacts, the charging device accordingly has six contacts and up to three charging circuits.

Yet further the present invention provides a system with a battery unit according to the present invention and with a charging device according to the present invention.

The embodiments and features described for the battery unit and the charging device apply accordingly to the system and vice versa.

It is particularly advantageous if the battery unit has a plurality of cell arrangements with lithium-ion cells, wherein a respective cell arrangement comprises a maximum of 14 lithium-ion cells connected in series.

This embodiment has the advantage that a charging voltage which is needed to charge the respective cell arrangement is below a value of 60 V (direct current). The charging voltage for a single lithium-ion cell is, for example, 4.2 V. Accordingly, no special safety precautions have to be taken for the charging device either, such as covering the contacts.

BRIEF DESCRIPTION OF THE FIGURES

The following description explains the invention with reference to exemplary embodiments and figures, in which.

Identical or functionally identical elements are indicated by identical reference signs in the figures, unless stated otherwise.

DETAILED DESCRIPTION

Figure 1:
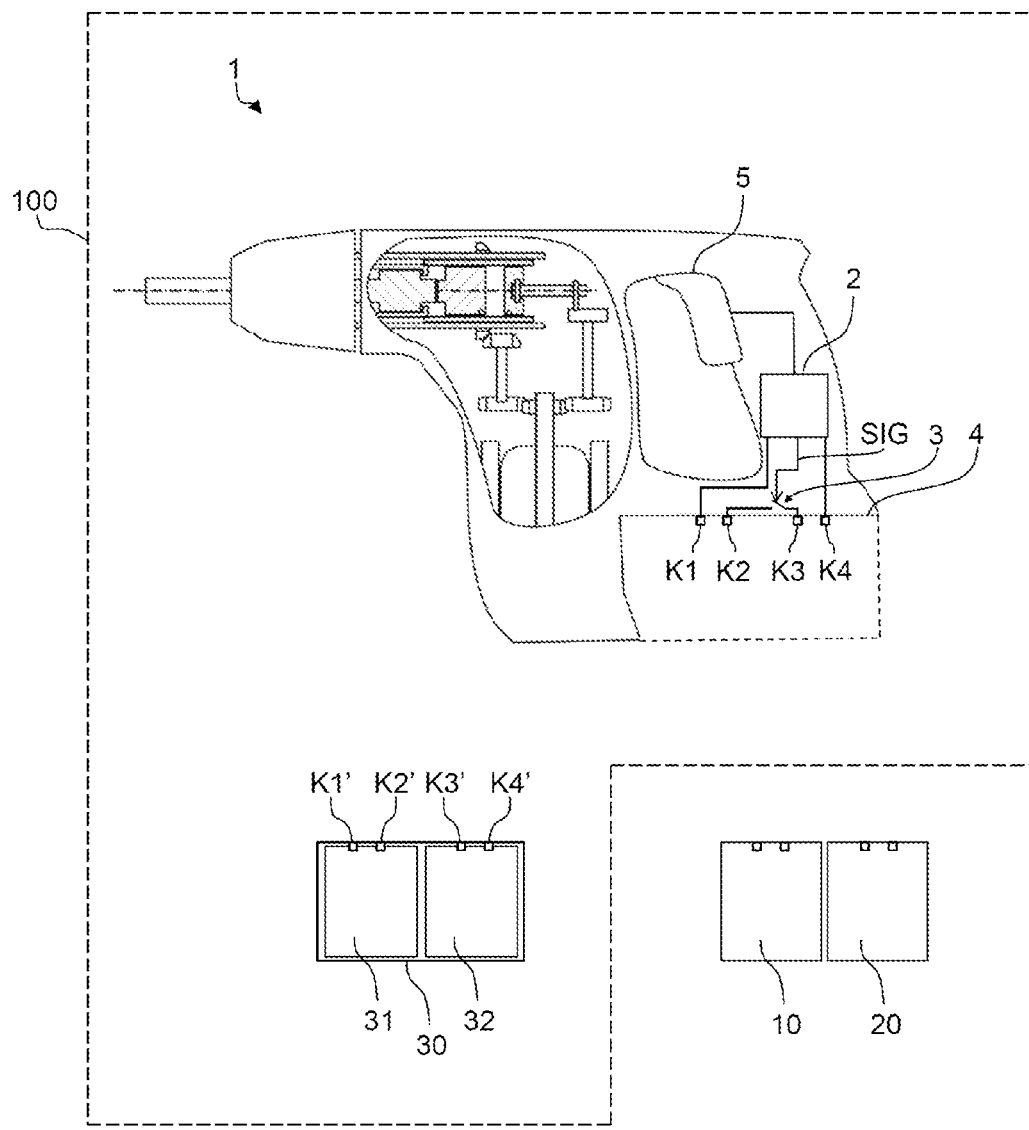
FIG. 1 shows a schematic view of a battery-operated handheld power tool.

FIG. 1 shows a schematic view of a battery-operated handheld power tool 1 which is in the form of a percussion drill here. The handheld power tool 1 has a receiving bay 4 which in this example has four contacts K1-K4. The receiving bay 4 is configured to receive two battery units 10, 20 or to receive one battery unit 30. In any case, the four contacts K1-K4 of the receiving bay 4 are brought into contact with four corresponding contacts K1'-K4' of the battery unit 30 or with the two respective contact pairs of the individual battery units 10, 20.

A load of the handheld power tool 1, in particular an electric motor (without a reference sign), is connected between a first contact K1 and a fourth contact K4 of the receiving bay 4. In the example illustrated, the contacts K1 and K4 are connected to a control device 2 which switches the drive current for the electric motor. A switch 3 that can be switched into an open and a closed switching state is connected between a second contact K2 and a third contact K3. Via the switch 3, a first cell arrangement 31 is connected in series with a second cell arrangement 32 of the battery unit or else a first battery unit 10 is connected in series with a second battery unit 20. By connecting the cell arrangements 31, 32 or the battery units 10, 20 in series, the output voltages of the cell arrangements 31, 32 or of the battery units 10, 20 add up. Correspondingly, an increased voltage can be tapped off between the first contact K1 and the fourth contact K4.

When the switch 3 is open, as shown in FIG. 1, the circuit is interrupted and no current can flow. This does not rule out that a current is drawn from the at least one battery unit 10, 20, 30, for example between the first contact K1 and the second contact K2. However, there is then correspondingly only a lower voltage.

The control device 2 is configured to output a specific control signal SIG for controlling the switch 3. In this example, the control device 2 controls the switch 3 to close, for example, when the main switch 5 of the handheld power tool 1 is actuated.

The dashed box in FIG. 1 is used to indicate a system 100 comprising a battery-operated handheld power tool 1 and a battery unit 30 with a plurality of cell arrangements 31, 32.

Figure 2:
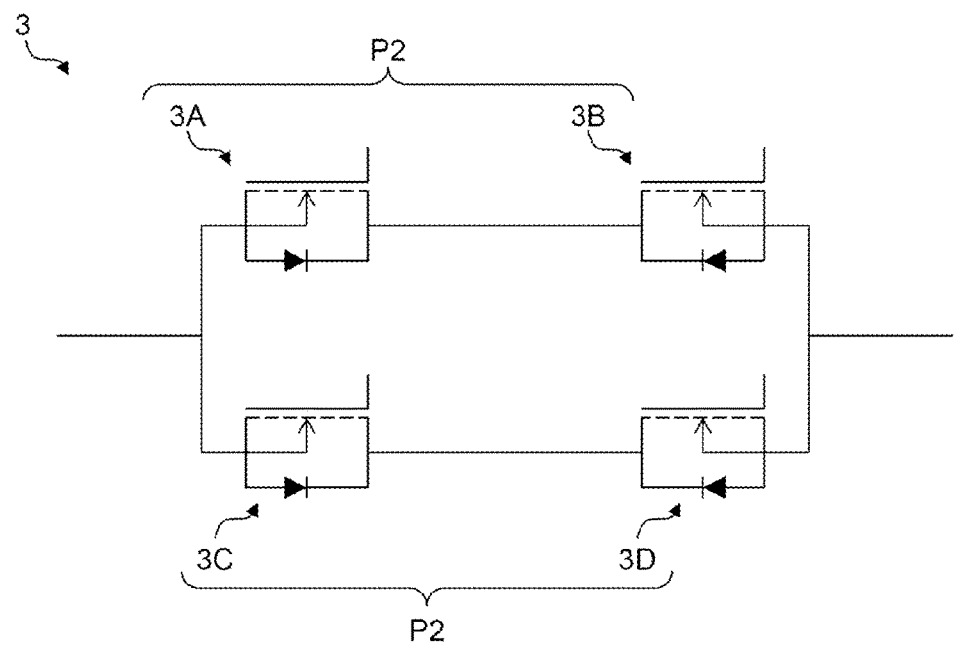
FIG. 2 shows a schematic circuit arrangement.

FIG. 2 shows a schematic circuit arrangement for a switch 3 which can be used, for example, in the handheld power tool 1 of FIG. 1. The switch 3 comprises four semiconductor elements 3A, 3B, 3C, 3D in the form of MOSFETs. The four MOSFETs 3A, 3B, 3C, 3D are arranged in two pairs P1, P2. The two pairs P1, P2 are electrically connected in parallel with one another. In a respective pair P1, P2, the MOSFETs 3A, 3B, 3C, 3D are connected with their forward direction in opposite directions. In order to enable a current to flow through one of the two branches, both MOSFETs of the respective branch must therefore be switched on.

All four MOSFETs 3A, 3B, 3C, 3D are advantageously controlled with the same specific control signal SIG (see FIG. 1), so that they are all switched on or off at the same time. In the arrangement shown, a current which flows through a respective MOSFET 3A, 3B, 3C, 3D is halved compared to an arrangement of only two MOSFETs 3A, 3B or 3C, 3D (for example only P1 or P2). This makes the switch 3 more robust and more reliable overall.

Figure 3:
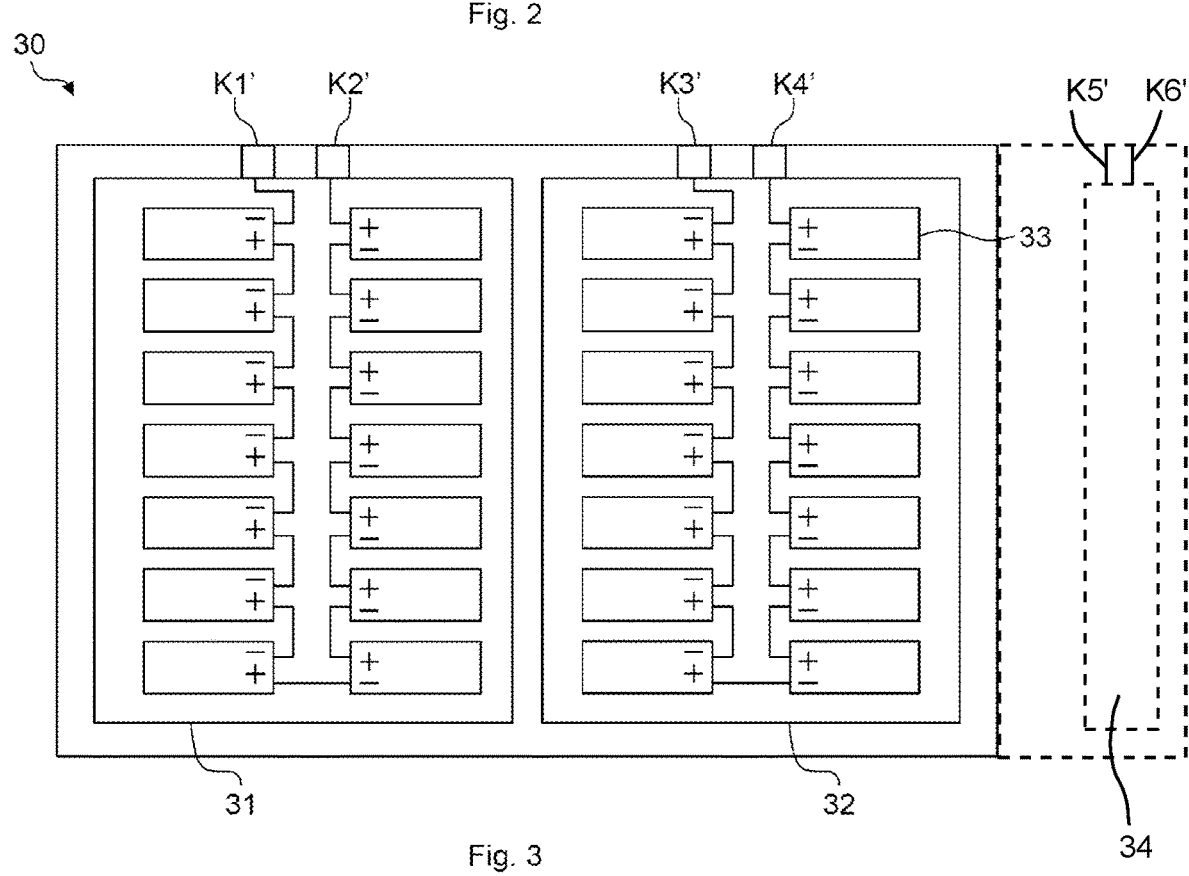
FIG. 3 shows a schematic view of a battery unit.

FIG. 3 shows a schematic view of a battery unit 30. The battery unit 30 can be used, for example, to operate the handheld power tool 1 in FIG. 1. The battery unit 30 has two cell arrangements 31, 32. Each cell arrangement 31, 32 comprises a plurality of individual cells 33 which are connected in series with one another, as is illustrated by way of example on the cell arrangement 32. These are, for example, lithium-ion cells 33, each of which provides a maximum output voltage of 3.6 V (when fully charged). When connected in series, the fourteen cells 33 thus achieve a maximum output voltage of 50.4 V.

The battery unit 30 has four contacts K1'-K4' which are guided to the outside. In each case, two of the contacts K1'-K4' are connected to the poles of an associated cell arrangement 31, 32. This means that, for example, an output voltage of a maximum of 50.4 V is available at the contacts K3' and K4'. When the two cell arrangements 31, 32 are connected in series using the switch 3 (see FIG. 1 or 2) during operation of the handheld power tool 1, as described with reference to FIG. 1, a maximum output voltage of 100.8 V is thus available.

It should be noted that the battery unit 30 can also have more than two cell arrangements 31, 32 and a respective cell arrangement 31, 32 can have more or fewer than fourteen cells 33 connected in series. Shown solely in FIG. 3 schematically is for example a possible alternate embodiment with a third cell arrangement 34 with contacts K5' and K6'. In particular, the number of cells 33 connected in series does not have to be identical for all cell arrangements 31, 32, but can differ.

Figure 4:
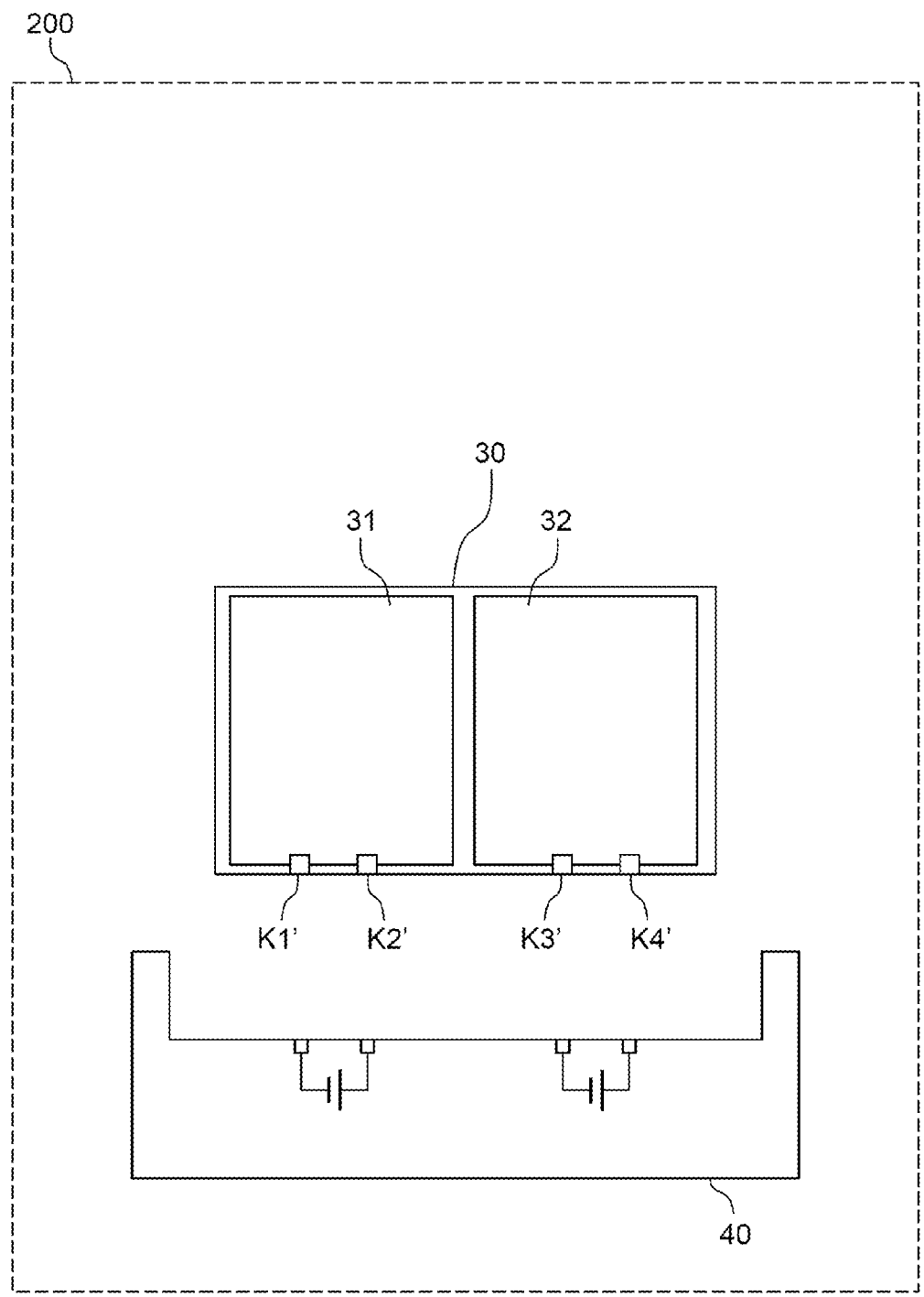
FIG. 4 shows a schematic view of a charging device for a battery unit.

FIG. 4 shows a schematic view of a charging device 40 for a battery unit 30. The battery unit 30 is, for example, the battery unit of FIG. 1 or FIG. 3. The charging device 40 has contact pairs (without reference signs) corresponding to the battery unit 30, so that each cell arrangement 31, 32 of the battery unit 30 can be charged separately. In this example, the charging device 40 has a respective controlled current source (without a reference sign) for this purpose, which are configured to provide a controlled charging current with a specific charging voltage.

If the battery unit 30, as described with reference to FIG. 3, has a maximum of fourteen lithium-ion cells 33 (see FIG. 3), the maximum charging voltage is 58.8 V (4.2 V per cell) and is thus advantageously below the threshold value for the protective low voltage of 60 V.

The dashed box in FIG. 4 is used to indicate a system 200 comprising a battery unit 30 with a plurality of cell arrangements 31, 32 and a charging device 40.

LIST OF REFERENCE SIGNS

1 Battery-operated handheld power tool
2 Control device
3 Switch
3A MOSFET
3B MOSFET
3C MOSFET
3D MOSFET
4 Receiving bay
5 Main switch
10 Battery unit
20 Battery unit
30 Battery unit
31 Cell arrangement
32 Cell arrangement
33 Cell
34 Cell arrangement
100 System
200 System
K1 Contact
K1' Contact
K2 Contact
K2' Contact
K3 Contact
K3' Contact
K4 Contact
K4' Contact
K5' Contact
K6' Contact
P1 Pair
P2 Pair
SIG Control signal

What is claimed is:
1. A system comprising:
at least one battery unit including a first cell arrangement and a second cell arrangement; and
a battery-operated handheld power tool including:
a receiving bay for releasably receiving the at least one battery unit, the receiving bay having first, second, third and fourth electrical contacts for making contact with at least four corresponding contacts of the at least one battery unit, wherein a load of the handheld power tool is connected between the first electrical contact and the fourth electrical contact; and a switch switchable to an open switching state and a closed switching state, the switch being connected between the second electrical contact and the third electrical contact, the switch connecting the first cell arrangement in series with the second cell arrangement, wherein the switch includes a semiconductor component including two MOSFETs connected in series with opposite polarity;

wherein the at least four corresponding contacts of the at least one battery unit are arranged in pairs, and wherein a respective pair of the at least four corresponding contacts of the at least one battery unit are connected to an associated one of the first and second cell arrangements.

2. The system as recited in claim 1 wherein the switch is operatable manually by a user of the handheld power tool.

3. The system as recited in claim 1 wherein the semiconductor component is changeable to an open switching state or a closed switching state by a specific control signal.

4. The system as recited in claim 3 further comprising a controller configured to output the control signal on a basis of actuation of a main switch of the handheld power tool.

5. The system as recited in claim 3 wherein the semiconductor component includes two additional MOSFETs, the two MOSFETs and the two additional MOSFETs being arranged in two pairs connected in parallel with one another.

6. The system as recited in claim 1 wherein each of the first and second cell arrangements has a maximum output voltage of less than 60 V.

7. The system as recited in claim 1 wherein each of the first and second cell arrangements includes a plurality of lithium-ion cells.

8. The system as recited in claim 7 wherein the plurality of lithium-ion cells comprise a maximum of 14 lithium-ion cells connected in series.

9. The system as recited in claim 1 wherein the at least four corresponding contacts of the at least one battery unit consist of exactly four contacts guided to an outside of the at least one battery unit.

10. The system as recited in claim 1 wherein the at least four corresponding contacts of the at least one battery unit consist of exactly six contacts guided to an outside of the at least one battery unit.

* * * * *